US012753088B2

(12) United States Patent
Wang

(10) Patent No.: US 12,753,088 B2
(45) Date of Patent: Oct. 6, 2026

(54) SODIUM ION BATTERY CATHODE MATERIAL, AND A PREPARATION METHOD AND APPLICATION THEREFOR

(71) Applicant: HUBEI WANRUN NEW ENERGY TECHNOLOGY CO., LTD., Shiyan (CN)

(72) Inventor: Qin Wang, Shiyan (CN)

(73) Assignee: HUBEI WANRUN NEW ENERGY TECHNOLOGY CO., LTD., Shiyan (CN)

( * ) Notice: Subject to any disclaimer, the term of this patent is extended or adjusted under 35 U.S.C. 154(b) by 402 days.

(21) Appl. No.: 18/699,580

(22) PCT Filed: Jul. 27, 2023

(86) PCT No.: PCT/CN2023/109516
§ 371 (c)(1),
(2) Date: Apr. 8, 2024

(87) PCT Pub. No.: WO2024/022431
PCT Pub. Date: Feb. 1, 2024

(65) Prior Publication Data
US 2024/0400408 A1 Dec. 5, 2024

(30) Foreign Application Priority Data
Jul. 29, 2022 (CN) ......................... 202210905141.2

(51) Int. Cl.
*C01G 49/06* (2006.01)
*H01M 4/04* (2006.01)
(Continued)

(52) U.S. Cl.
CPC .......... *C01G 49/06* (2013.01); *H01M 4/0471* (2013.01); *H01M 4/505* (2013.01);
(Continued)

(58) Field of Classification Search
CPC .... C01G 49/06; H01M 4/0471; H01M 4/505; H01M 10/054; C01P 2004/61; C01P 2004/02102
See application file for complete search history.

(56) References Cited

U.S. PATENT DOCUMENTS

2021/0167387 A1 6/2021 Ma et al.
2023/0046838 A1 * 2/2023 Palani ................ C01G 49/0027

FOREIGN PATENT DOCUMENTS

CN 102365127 A 2/2012
CN 106410154 A 2/2017
(Continued)

OTHER PUBLICATIONS

Qiuyu Shen et al. "Dual-Strategy of Cation-Doping and Nanoengineering Enables Fast and Stable Sodium-Ion Storage in a Novel Fe/Mn-Based Layered Oxide Cathode", Advanced Science, Sep. 24, 2020.
(Continued)

*Primary Examiner* — Richard M Rump
(74) *Attorney, Agent, or Firm* — The Sun IP Law

(57) ABSTRACT

The present disclosure relates to a sodium ion battery cathode material, and a preparation method and application therefor. The method for preparing a sodium ion battery cathode material of the present disclosure includes the following steps: (A) grinding a mixture of sodium borohydride and ferric manganese hydroxide to obtain first slurry, and performing spray drying and calcination on the first slurry to obtain a first calcinated material; and (B) grinding a mixture of the first calcinated material, a carbon source, a vanadium source, sodium bicarbonate, and water to obtain second slurry, and performing spray drying, calcination, crushing, sieving, and iron removal on the second slurry to obtain a sodium ion battery cathode material. The method is simple in step and low in cost, and the prepared sodium ion
(Continued)

battery cathode material has the characteristics of being good in conductivity, high in capacity, high in energy density, etc.

18 Claims, 4 Drawing Sheets

(51) Int. Cl.
*H01M 4/505* (2010.01)
*H01M 10/054* (2010.01)
*H01M 4/02* (2006.01)

(52) U.S. Cl.
CPC ....... *H01M 10/054* (2013.01); *C01P 2004/61* (2013.01); *H01M 2004/021* (2013.01); *H01M 2004/028* (2013.01)

(56) References Cited

FOREIGN PATENT DOCUMENTS

| | | | |
|---|---|---|---|
| CN | 107845796 | A | 3/2018 |
| CN | 110729475 | A | 1/2020 |
| CN | 111082059 | A | 4/2020 |
| CN | 111952579 | A | 11/2020 |
| CN | 112310390 | A | 2/2021 |
| CN | 112864389 | A | 5/2021 |
| CN | 113471431 | A | 10/2021 |
| CN | 113889603 | A | 1/2022 |
| CN | 114105155 | A | 3/2022 |
| CN | 114335529 | A | 4/2022 |
| CN | 114649518 | A | 6/2022 |
| CN | 114784270 | A | 7/2022 |
| CN | 114792798 | A | 7/2022 |
| CN | 115084484 | A | 9/2022 |
| CN | 115275134 | A | 11/2022 |
| EP | 3415470 | A1 | 12/2018 |
| JP | 2013187032 | A | 9/2013 |
| WO | 2021150168 | A1 | 7/2021 |

OTHER PUBLICATIONS

The CN priority application first search report issued on Jan. 29, 2023.
The CN priority application supplemental search report issued on Feb. 22, 2023.
Kalantarian et al., "Ab Initio Study of AMBO3 (A=Li, Na and M=Mn, Fe, Co, Ni) as Cathode Materials for Li-ion and Na-Ion Batteries", ACS Omega, USA, American Chemical Society, Apr. 6, 2020, vol. 5, Issue 15, pp. 8952-8961, httpe://doi.org/10.1021/acsomega. 0c00718.
The First Office Action of counterpart JP application No. 2024-521068 issued on Jul. 1, 2025.

* cited by examiner

SODIUM ION BATTERY CATHODE MATERIAL, AND A PREPARATION METHOD AND APPLICATION THEREFOR

CROSS-REFERENCE TO RELATED APPLICATION

The present application is a National Stage of International Patent Application No: PCT/CN2023/109516 filed on Jul. 27, 2023, which application claims the benefit of priority to Chinese Patent Application No. 202210905141.2 filed to the China National Intellectual Property Administration on Jul. 29, 2022 and entitled "A Sodium Ion Battery Cathode Material, and a Preparation Method and Application therefor", the disclosure of which is hereby incorporated by reference in its entirety.

TECHNICAL FIELD

The present disclosure relates to the technical field of sodium ion batteries, and in particular to a sodium ion battery cathode material, and a preparation method and application therefor.

BACKGROUND

The price of lithium resources is increased due to the explosion of automobile production capacity, and in addition to lithium, lithium batteries also use another rare metal-Cobalt (Co). Studies have shown that, producing one pure Electric Vehicle (EV) using current technologies needs to use approximately 20 kg of lithium and approximately 40 kg of Co. Scarce energy sources like lithium and cobalt will inevitably face resource diminishing and price rising. Sodium, as the 2nd lightest metal element after lithium, has an abundance as high as 2.3%-2.8%, which is 4-5 orders of magnitude higher than the lithium, and has similar physicochemical properties with the lithium, such that the sodium ion batteries have received widespread attention.

As early as the 1970s and 1980s, the sodium ion battery, known as a "post-lithium battery", has been proposed, and is started almost at the same time with the lithium ion batteries, but with the successful commercialization of the lithium ion batteries, the sodium ion battery research has gradually been diluted. At that time, the electrode materials successfully applied to the lithium ion batteries were simply applied to the sodium ion batteries without considering the difference between the sodium ion batteries and the lithium ion batteries in terms of lattice structure requirements of the materials, resulting in poor effects of the sodium ion batteries. In recent years, with the gradual recognition of lithium resource constraints brought by the large-scale application of the lithium ion batteries, as well as the full design of electrode materials from the special characteristics of the sodium ion batteries, which in turn has achieved better results, the sodium ion batteries have become a hot research topic again.

Currently, although a layered sodium oxide battery material has the advantage of high energy density, the cycle performance of the material is very poor. A sodium battery material with a prussian blue structure is still low in energy density and unstable in structure, and has toxic and harmful raw materials. A polyanionic sodium battery material has the advantages of being stable in structure and long in service life, but generally has a relatively low capacity and low energy density.

In view of this, the present disclosure is especially proposed.

SUMMARY

A first objective of the present disclosure is to provide a method for preparing a sodium ion battery cathode material. The method is simple in step and low in cost, and the prepared sodium ion battery cathode material has the characteristics of being good in conductivity, high in capacity, high in energy density, etc.

A second objective of the present disclosure is to provide a sodium ion battery cathode material, which is prepared by the method for preparing a sodium ion battery cathode material described above.

A third objective of the present disclosure is to provide a sodium ion battery, including the sodium ion battery cathode material described above.

In order to implement the above objectives of the present disclosure, the following technical solutions are particularly used.

The present disclosure provides the method for preparing a sodium ion battery cathode material. The method includes the following steps.

(A) A mixture of sodium borohydride and ferric manganese hydroxide is ground to obtain first slurry, and spray drying and calcination are performed on the first slurry to obtain a first calcinated material.

(B) A mixture of the first calcinated material, a carbon source, a vanadium source, sodium bicarbonate, and water is ground to obtain second slurry, and spray drying, calcination, crushing, sieving, and iron removal are performed on the second slurry to obtain a sodium ion battery cathode material.

The present disclosure further provides the sodium ion battery cathode material, which is prepared by the method for preparing a sodium ion battery cathode material described above.

The present disclosure further provides the sodium ion battery, including the sodium ion battery cathode material described above.

Compared with the related art, the present disclosure has the following beneficial effects.

According to the method for preparing a sodium ion battery cathode material of the present disclosure, through the doping of metal ions and the coating of sodium vanadate and carbon, ionic conductivity and electronic conductivity may be greatly improved, and the primary particle size of the sodium ion battery cathode material may be properly increased, such that compaction density is improved, and a degree of resistance of the material to oxygen and moisture is enhanced. Therefore, the energy density of the prepared sodium ion battery cathode material is close to that of a lithium iron phosphate material, which may reach 170 wh/kg, and the cost is also much lower than that of the lithium iron phosphate material.

In the sodium ion battery cathode material prepared by using the method for preparing a sodium ion battery cathode material, a polyanionic sodium battery material, i.e. sodium manganese iron borate, is used as a core, and the sodium vanadate and the carbon simultaneously coat the surface of the polyanionic sodium battery material, so as to form a protective layer. The sodium vanadate may protect the polyanionic sodium battery material of the core from contacting with oxygen and moisture, and facilitates the improvement of ionic conductivity, electronic conductivity, capacity, and cycle performance; and the carbon may further improve electronic conductivity, such that the sodium ion battery cathode material has excellent electrochemical performance.

BRIEF DESCRIPTION OF THE DRAWINGS

In order to more clearly illustrate the specific implementations of the present disclosure or the technical solutions in the related art, the drawings used in the description of the specific implementations or the related art will be briefly described below. It is apparent that the drawings in the following descriptions are some implementations of the present disclosure. Other drawings can be obtained from those skilled in the art according to these drawings without any creative work.

DETAILED DESCRIPTION OF THE EMBODIMENTS

Figure 1:
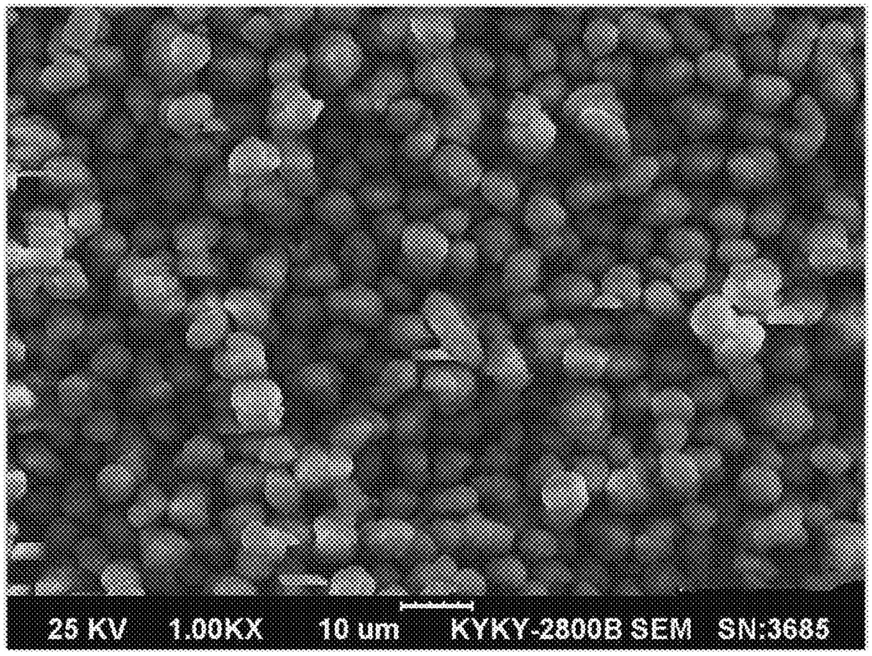
FIG. 1 is a Scanning Electron Microscope (SEM) diagram of ferric manganese hydroxide (II) prepared in Embodiment 1 of the present disclosure.

The technical solutions of the present disclosure will be clearly and completely described below with reference to the drawings and specific implementations, but it will be appreciated by those skilled in the art that the embodiments described below are a portion of the embodiments of the present disclosure and not all of the embodiments, and are used only for the purpose of describing the present disclosure and should not be considered as limiting the scope of the present disclosure. Based on the embodiments in the present disclosure, all other embodiments obtained by those of ordinary skill in the art without creative work shall fall within the protection scope of the present disclosure. If specific conditions are not indicated in the embodiments, the implementations are carried out in accordance with the conventional conditions or the conditions recommended by manufacturers. Reagents or instruments used are conventional products that may be purchased commercially if the manufacturers are not specified.

A sodium ion battery cathode material, and a preparation method and application therefor of embodiments of the present disclosure are described in detail below.

In some implementations, the present disclosure provides a method for preparing a sodium ion battery cathode material. The method includes the following steps.

(A) A mixture of sodium borohydride and ferric manganese hydroxide is ground to obtain first slurry, and spray drying and calcination are performed on the first slurry to obtain a first calcinated material.

(B) A mixture of the first calcinated material, a carbon source, a vanadium source, a sodium source, and water is ground to obtain second slurry, and spray drying, calcination, crushing, sieving, and iron removal are performed on the second slurry to obtain a sodium ion battery cathode material.

According to the method for preparing a sodium ion battery cathode material provided in the present disclosure, the first calcinated material, i.e. sodium manganese iron borate (Na (Fe,Mn)$BO_3$), is prepared by using the sodium borohydride and the ferric manganese hydroxide (II); the sodium borohydride is used as a boron source and the sodium source, and the sodium borohydride is used as a reducing agent, such that manganese ions and ferrous ions may be prevented from being oxidized, the sodium manganese iron borate with high purity may be obtained, and the uniform doping of manganese iron is realized; then after the prepared sodium manganese iron borate is mixed with the components such as the carbon source, the vanadium source, and the sodium source, the sodium vanadate and the carbon may simultaneously coat the surface of the sodium manganese iron borate through grinding, spray drying, and calcination, so as to form a protective layer; the sodium vanadate coating the surface of the polyanionic sodium battery material, i.e. the sodium manganese iron borate, may protect the polyanionic sodium battery material of the core from contacting with oxygen and moisture, and the sodium vanadate also has the characteristics of excellent ionic conductivity, electronic conductivity, high capacity, and good cycle performance; and the carbon coating the surface of the polyanionic sodium battery material may further improve the electronic conductivity. Therefore, the prepared sodium ion battery cathode material has excellent electrochemical performance.

According to the method for preparing a sodium ion battery cathode material of the present disclosure, through the doping of manganese and the coating of the sodium vanadate and the carbon, a voltage platform may be enhanced, and ionic conductivity and electronic conductivity are improved, and the primary particle size of the sodium ion battery cathode material may be properly increased, such that compaction density is improved, and a degree of resistance of the material to oxygen and moisture is further enhanced, the prepared sodium ion battery cathode material has the characteristics of high capacity and high energy density, the energy density of the sodium ion battery cathode material is close to that of the lithium iron phosphate material, and the cost is greatly reduced compared to the cost of the lithium iron phosphate material.

According to the current price of each raw material, the raw materials, energy consumption, device depreciation, and labor costs of the sodium ion battery cathode material of the present disclosure total about 39,500 yuan/ton, while the raw materials, energy consumption, device depreciation, and labor costs of the lithium iron phosphate material total about 132,000 yuan/ton, such that the preparation cost of the sodium ion battery cathode material of the present disclosure is significantly lower than that of the lithium iron phosphate material.

In some implementations of the present disclosure, in step (A), calcination includes: in a nitrogen atmosphere, heating a temperature to 400-500° C., maintaining the temperature for 4-5 h, then heating the temperature to 650-700° C., maintaining the temperature for 3-5 h, and then cooling the temperature to ≤120° C. Preferably, a relative humidity of the calcination is 3%-5%.

In some implementations of the present disclosure, in step (A), calcination includes: in the nitrogen atmosphere, heating the temperature to 400-500° C. at a rate of 1-3° C./min, maintaining the temperature for 4-5 h, then heating the temperature to 650-700° C. at the rate of 1-3° C./min, maintaining the temperature for 3-5 h, then cooling the temperature to ≤120° C. at the rate of 1-3° C./min, and performing discharging.

In the method for preparing a sodium ion battery cathode material of the present disclosure, during the calcination process, nitrogen with certain humidity, used as a protective gas and a reactant, may be reacted with the sodium borohydride to obtain a reducing gas, such that the manganese ions and the ferrous ions are prevented from being oxidized.

In some implementations of the present disclosure, in step (A), the first slurry is obtained by grinding a mixture of a sodium borohydride aqueous solution and the ferric manganese hydroxide. Preferably, the concentration of the sodium borohydride aqueous solution is 1-1.5 mol/L.

In some implementations of the present disclosure, in step (A), a ratio of the sum of the numbers of moles of Fe and Mn in the ferric manganese hydroxide (II) to the number of moles of Na in the sodium borohydride is 0.97-1.02:1. Typical but non-restrictive, for example, the ratio of the sum of the numbers of moles of Fe and Mn in the ferric manganese hydroxide (II) to the number of moles of Na in the sodium borohydride is 0.97:1, 0.98:1, 0.99:1, 1:1, 1.01:1, or 1.02:1, and the like.

In some implementations of the present disclosure, in step (A), a particle size of the first slurry is 200-300 nm. Typical but non-restrictive, for example, in step (A), the particle size of the first slurry is 200 nm, 220 nm, 240 nm, 260 nm, 280 nm, or 300 nm, and the like.

In some implementations of the present disclosure, in step (A), a method for preparing the ferric manganese hydroxide (II) includes the following steps.

Reaction is performed on a manganese salt, a ferrous salt, a complexing agent, sodium hydroxide, hydrazine hydrate, aqueous ammonia, and titanyl sulfate in an aqueous phase, so as to obtain the ferric manganese hydroxide (II).

In the present disclosure, through co-precipitation, the ferric manganese hydroxide with homogeneous co-precipitation of manganese and iron is first prepared, and then is reacted with the sodium borohydride, such that the uniform doping of manganese iron may be realized to avoid the existence of a separate enrichment of sodium manganese borate at a certain place, causing capacity fading.

In some implementations of the present disclosure, in the method for preparing the ferric manganese hydroxide (II), a reaction temperature is 50-60° C., and reaction time is 15-150 min.

In some implementations of the present disclosure, in the method for preparing the ferric manganese hydroxide, a molar ratio of Mn in the manganese salt to Fe in the ferrous salt is 1:1.5-4. Typical but non-restrictive, for example, the molar ratio of Mn in the manganese salt to Fe in the ferrous salt is 1:1.5, 1:2, 1:2.5, 1:3, 1:3.5, or 1:4, and the like.

In some implementations of the present disclosure, in the method for preparing the ferric manganese hydroxide, a ratio of the sum of the numbers of moles of the Mn in the manganese salt and the Fe in the ferrous salt to the number of moles of Ti in the titanyl sulfate is 100:0.1-0.2.

In some implementations of the present disclosure, in the method for preparing the ferric manganese hydroxide, a molar ratio of the manganese salt, the complexing agent, the sodium hydroxide, the hydrazine hydrate, and $NH_3 \cdot H_2O$ in the aqueous ammonia is 1:0.01-0.1:5.5-10.5:0.01-0.1:0.05-0.5.

In some implementations of the present disclosure, in the method for preparing the ferric manganese hydroxide, a ratio of the sum of the mass of the manganese salt, the ferrous salt, the complexing agent, the sodium hydroxide, the hydrazine hydrate, the aqueous ammonia, and the titanyl sulfate to the mass of the water is 10:1.5-3.

In some implementations of the present disclosure, in the method for preparing the ferric manganese hydroxide, the manganese salt includes at least one of manganese sulfate, manganese chloride, or manganese acetate; the ferrous salt includes at least one of ferrous sulfate, ferrous chloride, or ferrous acetate; and the complexing agent includes at least one of Ethylenediaminetetraacetic Acid (EDTA), ethylenediaminetetraacetic acid disodium salt, sodium hexametaphosphate, or triethanolamine.

In some specific implementations of the present disclosure, in the method for preparing the ferric manganese hydroxide, the concentration of the aqueous ammonia is 5-8 mol/L.

In some specific implementations of the present disclosure, the method for preparing the ferric manganese hydroxide includes the following steps.

The mixed solution of the manganese salt, the ferrous salt, the complexing agent, the sodium hydroxide, the hydrazine hydrate, the aqueous ammonia, the titanyl sulfate, and the water is slowly added to a reactor, the pH of the mixed solution is 9.5-10, a temperature is controlled at 50-60° C. during addition, and after addition, the reaction continues to perform for 15-30 min at 50-60° C.; and the concentration of free ammonia in the mixed solution is controlled at 8-12 g/L during reaction. During reaction, a reaction occurs, the aqueous ammonia precipitates with metal ions to obtain ammonium roots, which are not free ammonia, and at the same time, some of the ammonia is volatilized, such that the amount of aqueous ammonia added needs to be continuously regulated to regulate the free ammonia in the solution.

In some implementations of the present disclosure, in step (B), the vanadium source includes ammonium metavanadate.

In some implementations of the present disclosure, in step (B), the sodium source includes at least one of sodium bicarbonate, sodium hydroxide, sodium acetate, and sodium nitrate; and preferably, the sodium source includes the sodium bicarbonate.

In some implementations of the present disclosure, in step (B), the carbon source includes nano hydrophilic graphite and/or polyethylene glycol; and preferably, a mass ratio of the nano hydrophilic graphite to the polyethylene glycol is 1:5-10.

According to the method for preparing a sodium ion battery cathode material provided in the present disclosure, in step (B), before calcination, the conductivity of a coating layer may be greatly improved by introducing an inorganic carbon source. Carbon obtained from thermal decomposition of conventional organic carbon sources is amorphous carbon with a very low degree of graphitization, and the conductivity is lower than that of graphitized carbon, while in the present disclosure, the inorganic carbon source is directly introduced, and the polyethylene glycol is simultaneously added to achieve dispersion, during a secondary calcination process, the polyethylene glycol also thermally decomposes to obtain carbon, realizing the compounding of the inorganic carbon source and the organic carbon source, and the organic carbon sources for a carbon mesh, which is connected to the inorganic carbon sources, such that the problem of non-uniform coating of the inorganic carbon sources in the coating layer is solved.

In some implementations of the present disclosure, in step (B), a molar ratio of sodium in the first calcinated material, vanadium in the vanadium source, and sodium in the sodium source is 1:0.02-0.03:0.06-0.09.

In some implementations of the present disclosure, in step (B), a mass ratio of the carbon source to the first calcinated material is 3-10:100; and preferably, the mass ratio of the carbon source to the first calcinated material is 5-8:100.

In some implementations of the present disclosure, in step (B), a ratio of the total mass of the first calcinated material, the carbon source, the vanadium source, and the sodium source to the mass of the water is 1:2-3.

In some implementations of the present disclosure, in step (B), calcination includes: in a nitrogen atmosphere, heating a temperature to 720-750° C., maintaining the temperature for 2-4 h, and then cooling the temperature to ≤80° C. Preferably, in step (B), calcination includes: in the nitrogen atmosphere, heating the temperature to 720-750° C. at a rate of 1-3° C./min, maintaining the temperature for 2-4 h, and then cooling the temperature to ≤80° C. at the rate of 1-3° C./min.

In some implementations of the present disclosure, in step (B), a particle size of the second slurry is 100-200 nm.

In some implementations of the present disclosure, in step (B), the particle size of the second slurry after spray drying is 5-10 μm. Preferably, spray drying uses a pressure spray dryer.

In some implementations of the present disclosure, in step (B), crushing includes crushing using a jet mill. Preferably, the particle size of the second slurry after crushing to spray drying is 0.5-2 μm. More preferably, a crushing temperature is 120-150° C., a crushing pressure is 0.25-0.5 MPa, and crushing includes performing crushing in the nitrogen atmosphere.

In some implementations of the present disclosure, in step (B), sieving includes using a 100-200-mesh ultrasonic vibrating screen.

In some implementations of the present disclosure, in step (B), iron removal includes performing iron removal using an electromagnetic iron remover until magnetic substances in the second slurry after crushing is less than or equal to 1 ppm.

In some implementations, the present disclosure further provides a sodium ion battery cathode material, which is prepared by the method for preparing a sodium ion battery cathode material described above.

In some implementations of the present disclosure, primary particle size of the sodium ion battery cathode material is 150-250 nm.

The sodium ion battery cathode material of the present disclosure uses layered sodium oxide sodium vanadate and the carbon as the surface, and uses the polyanionic sodium battery material as the core, and the sodium vanadate and the carbon coat the surface of the polyanionic sodium battery material, so as to form a protective layer.

In some implementations, the present disclosure further provides a sodium ion battery, including the sodium ion battery cathode material described above.

Embodiment 1

The method for preparing a sodium ion battery cathode material provided in this embodiment included the following steps.

(A) A sodium borohydride aqueous solution with the concentration being 1.3 mol/L and ferric manganese hydroxide (II) were mixed and then added to a sand mill for sanding, so as to obtain first slurry with the particle size being 252 nm, spray drying was performed on the first slurry, then in nitrogen with relative humidity being 4.1%, a temperature was heated to 450° C. at a rate of 3° C./min and maintained for 5 h, then the temperature was heated to 680° C. at a rate of 2° C./min and maintained for 4 h, then the temperature was cooled to 120° C. at the rate of 3° C./min, and discharging was performed to obtain a first calcinated material.

Wherein, a ratio of the sum of the numbers of moles of Mn and Fe in the ferric manganese hydroxide (II) to the number of moles of the sodium borohydride was 1.01:1.

A method for preparing the ferric manganese hydroxide (II) included the following steps: adding a mixed solution of manganese sulfate, ferrous sulfate, EDTA, sodium hydroxide, aqueous ammonia (with a concentration being 6 mol/L), hydrazine hydrate, titanyl sulfate, and deionized water to a reactor, where a molar ratio of the manganese sulfate, the ferrous sulfate, the EDTA, the sodium hydroxide, the hydrazine hydrate, and $NH_3 \cdot H_2O$ in the aqueous ammonia was 1:2.52:0.05:7.58:0.04:0.18, a ratio of the sum of the numbers of moles of Mn in the manganese sulfate and Fe in the ferrous sulfate to the number of moles of Ti in the titanyl sulfate was 100:0.2, addition time was 95 min, the pH of the mixed solution during addition was 9.76, a stirring speed was 500 r/min, and the temperature was 55° C.; continuing to react for 25 min at 55° C. after addition, so as to obtain reaction liquid, and controlling the concentration of free ammonia in the solution to be 10 g/L during reaction; and filtrating the reaction liquid to obtain a filter cake, washing the filter cake by 0.015 mol/L hydrazine hydrate, then putting same into a vacuum oven for drying, so as to obtain the ferric manganese hydroxide (II).

(B) The first calcinated material, a carbon source, ammonium metavanadate, sodium bicarbonate, and water were mixed and added to the sand mill for sanding, so as to obtain second slurry with the particle size being 183 nm, and spray drying was performed on the second slurry by using a pressure spray dryer, so as to obtain a spray material with the particle size being 8.7 μm; in a nitrogen atmosphere, the spray material was heated to 735° C. at a rate of 3° C./min and maintained for 3 h, then the temperature was cooled to 80° C. at the rate of 3° C./min, and discharging was performed to obtain a second calcinated material; in a nitrogen atmosphere with a pressure being 0.35 MPa, the second calcinated material was crushed at 145° C., until the particle size of the second calcinated material was 1.2 μm; then a 150-mesh ultrasonic vibrating screen was used, then an electromagnetic iron remover was used to perform iron removal until magnetic substances in the second calcinated material were 0.21 ppm, and then vacuum packaging was performed to obtain the sodium ion battery cathode material.

Wherein, the carbon source included nano hydrophilic graphite and polyethylene glycol, with a mass ratio being 1:7; a molar ratio of sodium in the first calcinated material, vanadium in the ammonium metavanadate, and the sodium bicarbonate was 1:0.025:0.08; and a mass ratio of the carbon source to the first calcinated material was 6:100, and a ratio of the total mass of the first calcinated material, the carbon source, the ammonium metavanadate, and the sodium bicarbonate to the mass of the water was 1:2.5.

Embodiment 2

The method for preparing a sodium ion battery cathode material of this embodiment included the following steps.

(A) A sodium borohydride aqueous solution with the concentration being 1 mol/L and ferric manganese hydroxide (II) were mixed and then added to a sand mill for sanding, so as to obtain first slurry with the particle size being 200 nm, spray drying was performed on the first slurry, then in nitrogen with relative humidity being 3%, a temperature was heated to 400° C. at a rate of 1.5° C./min and maintained for 5 h, then the temperature was heated to 650° C. at a rate of 1° C./min and maintained for 5 h, then the temperature was cooled to 120° C. at the rate of 3° C./min, and discharging was performed to obtain a first calcinated material.

A ratio of the sum of the numbers of moles of Mn and Fe in the ferric manganese hydroxide (II) to the number of moles of the sodium borohydride was 0.97:1.

A method for preparing the ferric manganese hydroxide (II) included the following steps: adding a mixed solution of manganese chloride, ferrous sulfate, EDTA, sodium hydroxide, aqueous ammonia (with a concentration being 5 mol/L), hydrazine hydrate, titanyl sulfate, and deionized water to a reactor, where a molar ratio of the manganese chloride, the ferrous sulfate, the EDTA, the sodium hydroxide, the hydrazine hydrate, and $NH_3 \cdot H_2O$ in the aqueous ammonia was 1:1.5:0.01:5.5:0.01:0.05, a ratio of the sum of the numbers of moles of Mn in the manganese chloride and Fe in the ferrous sulfate to the number of moles of Ti in the titanyl sulfate was 100:0.1, addition time was 60 min, the pH of the mixed solution during addition was 9.6, a stirring speed was 600 r/min, and the temperature was 60° C.; continuing to react for 30 min at 60° C. after addition, so as to obtain reaction liquid, and controlling the concentration of free ammonia in the solution to be 10 g/L during reaction; and filtrating the reaction liquid to obtain a filter cake, washing the filter cake by 0.01 mol/L hydrazine hydrate, then putting same into a vacuum oven for drying, so as to obtain the ferric manganese hydroxide (II).

(B) The first calcinated material, a carbon source, ammonium metavanadate, sodium bicarbonate, and water were mixed and added to the sand mill for sanding, so as to obtain second slurry with the particle size being 100 nm, and spray drying was performed on the second slurry by using a pressure spray dryer, so as to obtain a spray material with the particle size being 5 μm; in a nitrogen atmosphere, the spray material was heated to 720° C. at a rate of 3° C./min and maintained for 2 h, then the temperature was cooled to 80° C. at the rate of 3° C./min, and discharging was performed to obtain a second calcinated material; in a nitrogen atmosphere with a pressure being 0.35 MPa, the second calcinated material was crushed at 145° C., until the particle size of the second calcinated material was 1.1 μm; then a 150-mesh ultrasonic vibrating screen was used, then an electromagnetic iron remover was used to perform iron removal until magnetic substances in the second calcinated material were 0.3 ppm, and then vacuum packaging was performed to obtain the sodium ion battery cathode material.

Wherein, the carbon source included nano hydrophilic graphite and polyethylene glycol, with a mass ratio being 1:5; a molar ratio of sodium in the first calcinated material, vanadium in the ammonium metavanadate, and the sodium bicarbonate was 1:0.02:0.06; and a mass ratio of the carbon source to the first calcinated material was 3:100, and a ratio of the total mass of the first calcinated material, the carbon source, the ammonium metavanadate, and the sodium bicarbonate to the mass of the water was 1:2.

Embodiment 3

The method for preparing a sodium ion battery cathode material of this embodiment included the following steps.

(A) A sodium borohydride aqueous solution with the concentration being 1.5 mol/L and ferric manganese hydroxide (II) were mixed and then added to a sand mill for sanding, so as to obtain first slurry with the particle size being 300 nm, spray drying was performed on the first slurry, then in nitrogen with relative humidity being 5%, a temperature was heated to 500° C. at a rate of 3° C./min and maintained for 5 h, then the temperature was heated to 700° C. at a rate of 3° C./min and maintained for 4 h, then the temperature was cooled to 120° C. at the rate of 1° C./min, and discharging was performed to obtain a first calcinated material.

Wherein, a ratio of the sum of the numbers of moles of Mn and Fe in the ferric manganese hydroxide (II) to the number of moles of the sodium borohydride was 1.02:1.

A method for preparing the ferric manganese hydroxide (II) included the following steps: adding a mixed solution of manganese acetate, ferrous chloride, triethanolamine, sodium hydroxide, aqueous ammonia (with a concentration being 8 mol/L), hydrazine hydrate, titanyl sulfate, and deionized water to a reactor, where a molar ratio of the manganese acetate, the ferrous chloride, the triethanolamine, the sodium hydroxide, the hydrazine hydrate, and $NH_3 \cdot H_2O$ in the aqueous ammonia was 1:4:0.1:10.5:0.1:0.5, a ratio of the sum of the numbers of moles of Mn in the manganese chloride and Fe in the ferrous sulfate to the number of moles of Ti in the titanyl sulfate was 100:0.2, addition time was 120 min, the pH of the mixed solution during addition was 9.9, a stirring speed was 550 r/min, and the temperature was 50° C.; continuing to react for 25 min at 50° C. after addition, so as to obtain reaction liquid, and controlling the concentration of free ammonia in the solution to be 10 g/L during reaction; and filtrating the reaction liquid to obtain a filter cake, washing the filter cake by 0.015 mol/L hydrazine hydrate, then putting same into a vacuum oven for drying, so as to obtain the ferric manganese hydroxide (II).

(B) The first calcinated material, a carbon source, ammonium metavanadate, sodium bicarbonate, and water were mixed and added to the sand mill for sanding, so as to obtain second slurry with the particle size being 200 nm, and spray drying was performed on the second slurry by using a pressure spray dryer, so as to obtain a spray material with the particle size being 10 μm; in a nitrogen atmosphere, the spray material was heated to 750° C. at a rate of 3° C./min and maintained for 3 h, then the temperature was cooled to 80° C. at the rate of 3° C./min, and discharging was performed to obtain a second calcinated material; in a nitrogen atmosphere with a pressure being 0.35 MPa, the second calcinated material was crushed at 145° C., until the particle size of the second calcinated material was 1.3 μm; then a 150-mesh ultrasonic vibrating screen was used, then an electromagnetic iron remover was used to perform iron removal until magnetic substances in the second calcinated material were 0.2 ppm, and then vacuum packaging was performed to obtain the sodium ion battery cathode material.

Wherein, the carbon source included nano hydrophilic graphite and polyethylene glycol, with a mass ratio being 1:10; a molar ratio of sodium in the first calcinated material, vanadium in the ammonium metavanadate, and the sodium bicarbonate was 1:0.03:0.09; and a mass ratio of the carbon source to the first calcinated material was 10:100, and a ratio of the total mass of the first calcinated material, the carbon source, the ammonium metavanadate, and the sodium bicarbonate to the mass of the water was 1:3.

Comparative Embodiment 1

The method for preparing a sodium ion battery cathode material provided in this comparative embodiment refers to Embodiment 1, and a difference only lies in that, in step (B), the ammonium metavanadate was not added.

Test Embodiment 1

A scanning test was performed on the ferric manganese hydroxide (II) prepared in Embodiment 1, and results were shown in FIG. 1.

From FIG. 1, it might be learned that, the ferric manganese hydroxide (II) prepared in the present disclosure was spherical in shape, was a flocculated agglomerate, and was large in specific surface area, small in primary particle size, and high in reaction activity.

The properties of the ferric manganese hydroxide (II) prepared in Embodiment 1 were tested, and results were shown in Table 1.

TABLE 1

| Test | Data | Test | Data |
|---|---|---|---|
| Mn content (wt %) | 18.35 | D50 (μm) | 6.3 |
| Fe content (wt %) | 43.11 | D90 (μm) | 11.7 |
| Rapid moisture (%) | 0.17 | Ca content (ppm) | 27.5 |
| Apparent density (g/mL) | 0.37 | Mg content (ppm) | 12.7 |
| Tap density (g/mL) | 0.76 | Na content (ppm) | 25.9 |
| BET surface area ($m^2/g$) | 28.6 | Ti content (wt %) | 0.07 |
| D10 (μm) | 2.9 | | |

Test Embodiment 2

Figure 2:
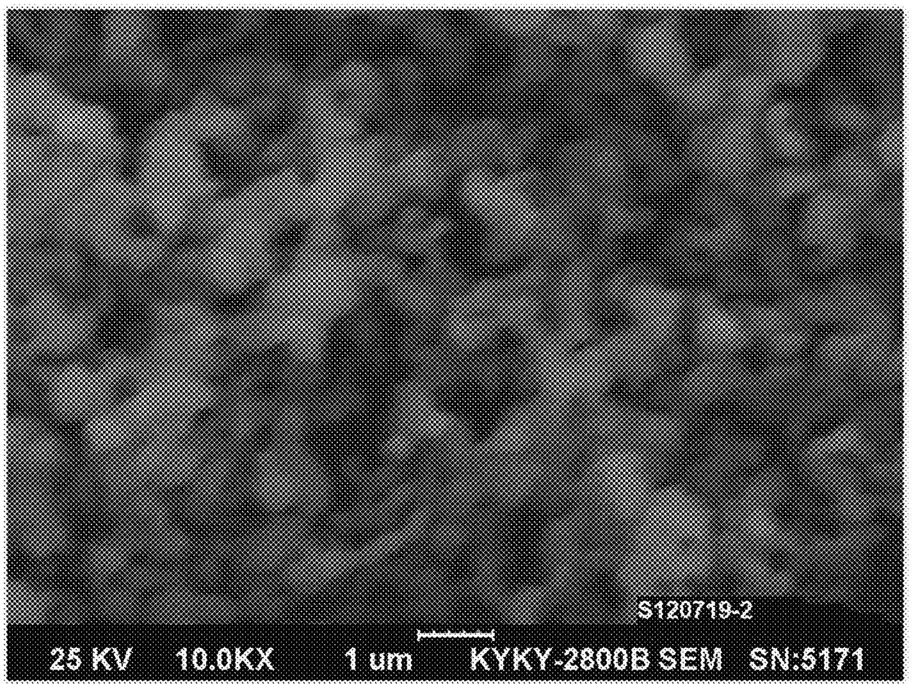
FIG. 2 is an SEM diagram of a first calcinated material prepared in Embodiment 1 of the present disclosure.

A scanning test was performed on the first calcinated material prepared in Embodiment 1, and results were shown in FIG. 2. The properties of the first calcinated material prepared in Embodiment 1 were tested, and results were shown in Table 2. A compaction density was the density of a powder product under 3 T.

TABLE 2

| Test | Data | Test | Data |
|---|---|---|---|
| Na content (wt %) | 16.41 | Tap density (g/mL) | 1.52 |
| Mn content (wt %) | 11.93 | Compaction density (g/mL) | 2.47 |
| Fe content (wt %) | 28.01 | $Fe^{3+}$ content (ppm) | 104 |
| B content (wt %) | 7.71 | Ca content (ppm) | 42.5 |
| BET surface area ($m^2/g$) | 3.87 | Mg content (ppm) | 15.3 |
| Apparent density (g/mL) | 0.71 | Ti content (ppm) | 435 |

Test Embodiment 3

Figure 3:
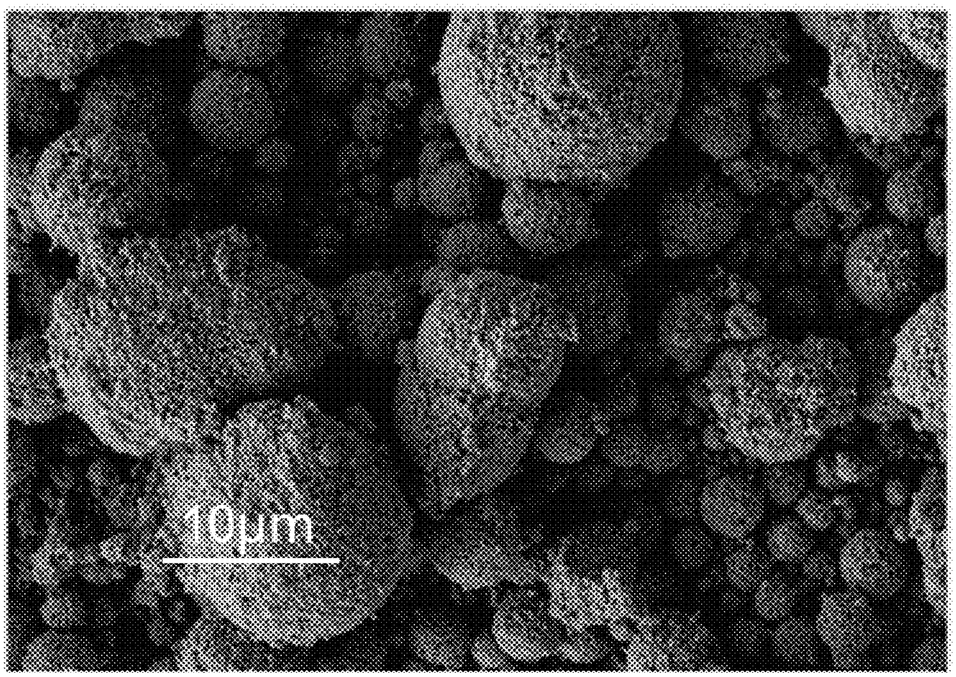
FIG. 3 is an SEM diagram of a spray material prepared in Embodiment 1 of the present disclosure.
Figure 4:
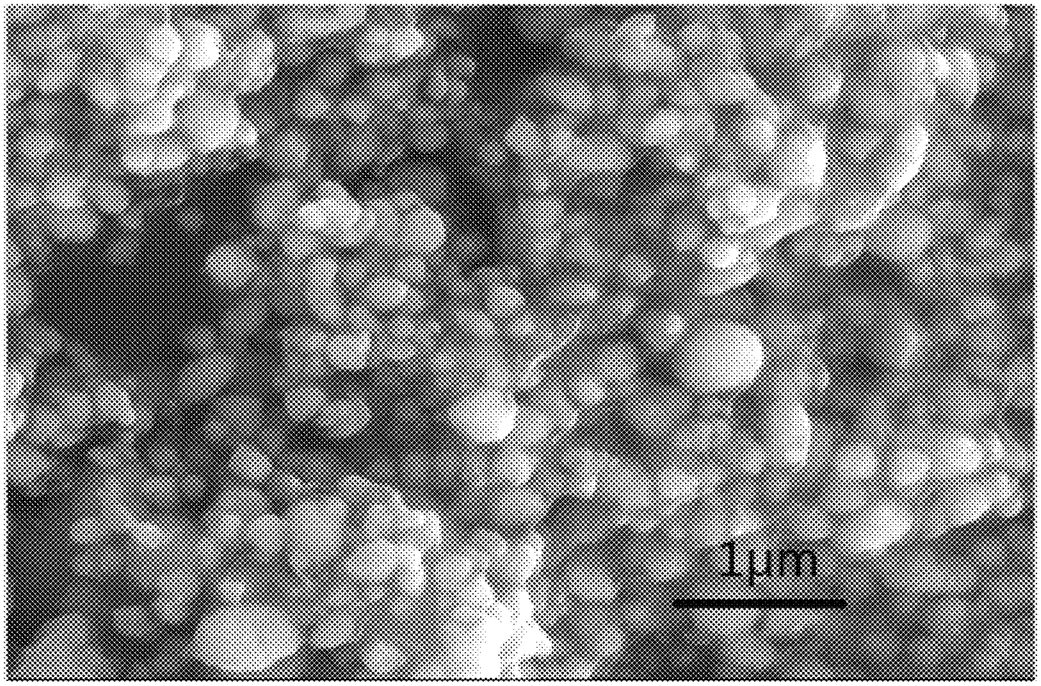
FIG. 4 is an SEM diagram of a sodium ion battery cathode material prepared in Embodiment 1 of the present disclosure.

A scanning test was performed on the spray material prepared in Embodiment 1, and results were shown in FIG. 3. A scanning test was performed on the sodium ion battery cathode material prepared in Embodiment 1, and results were shown in FIG. 4. The properties of the sodium ion battery cathode material prepared in Embodiment 1 were tested, and results were shown in Table 3. A compaction density was the density of a powder product under 3 T.

TABLE 3

| Test | Data | Test | Data |
|---|---|---|---|
| Na content (wt %) | 17.29 | Compaction density (g/mL) | 2.37 |
| Mn content (wt %) | 11.36 | $Fe^{3+}$ content (ppm) | 31.6 |
| Fe content (wt %) | 26.69 | Ca content (ppm) | 40.5 |
| B content (wt %) | 7.35 | Mg content (ppm) | 17.9 |
| BET surface area ($m^2/g$) | 12.98 | Ti content (ppm) | 401.6 |
| Apparent density (g/mL) | 0.64 | V content (ppm) | 7013.7 |
| Tap density (g/mL) | 1.31 | C content (wt %) | 1.53 |

Figure 5:
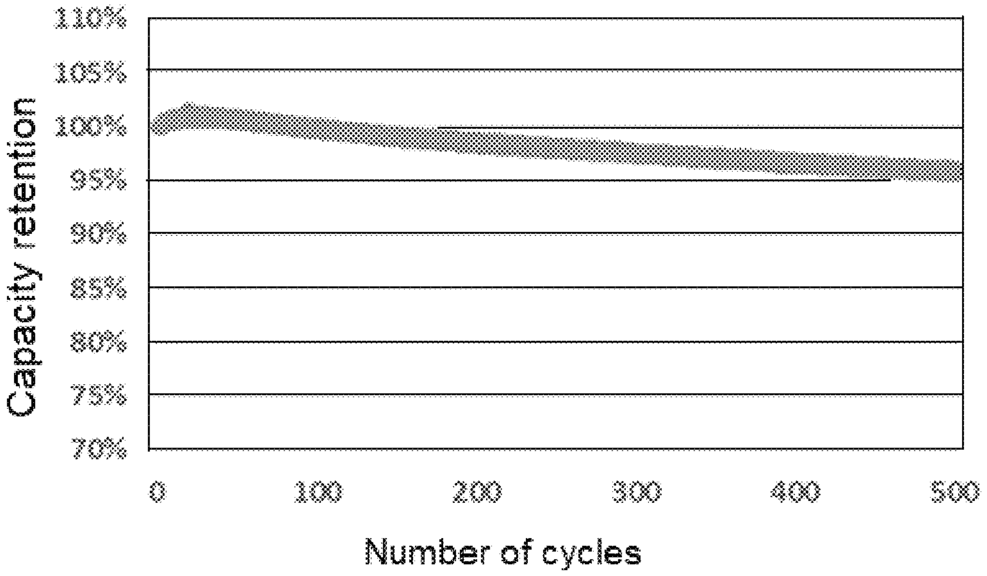
FIG. 5 is a relationship diagram of capacity retention and the number of cycles of a sodium ion battery cathode material prepared in Embodiment 1 of the present disclosure.
Figure 6:
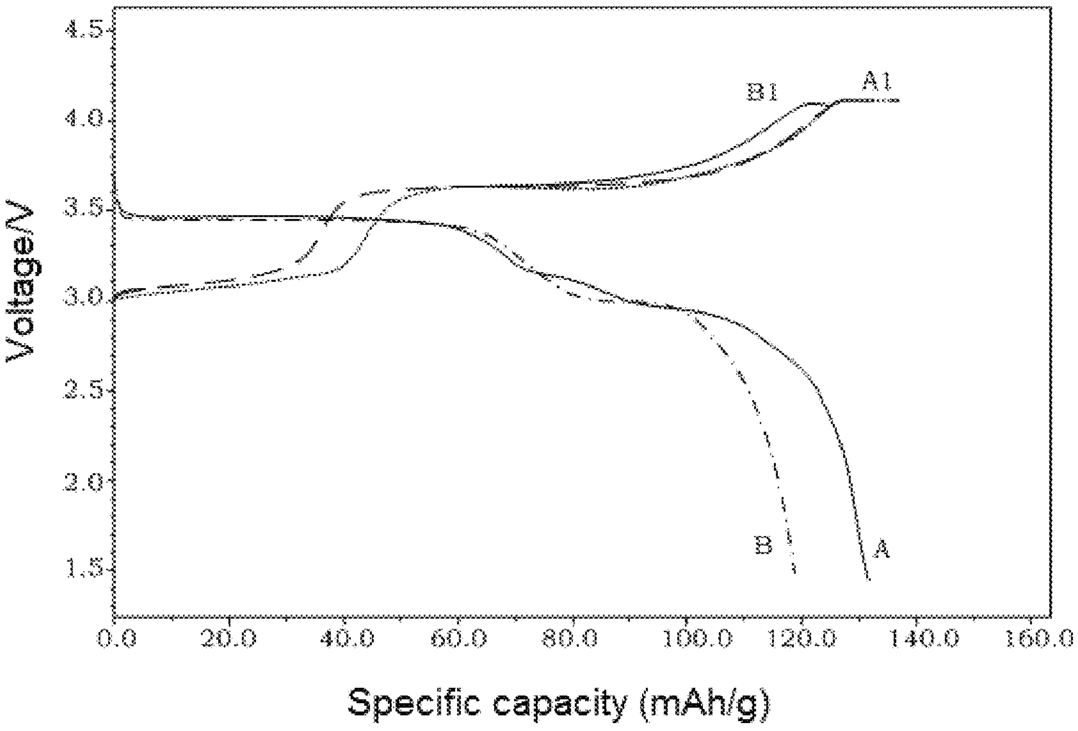
FIG. 6 is a charging and discharging curve of a sodium ion battery cathode material prepared in Embodiment 1 of the present disclosure.

A cathode material was prepared by using the sodium ion battery cathode material prepared in Embodiment 1 and the sodium ion battery cathode material prepared in Comparative embodiment 1, and using a carbon-coated aluminum foil as a current collector; sodium hexafluorophosphate was simultaneously used as an electrolyte, hard carbon was used as an anode, and a 3 Ah soft pack battery was obtained through preparation. At 25° C., a cycle performance test was performed at a rate of 1 C. FIG. 5 was a relationship diagram of capacity retention and the number of cycles of the sodium ion battery cathode material prepared in Embodiment 1. FIG. 6 was a charging and discharging curve of the sodium ion battery cathode material prepared in Embodiment 1, where A1 and A were charging and discharging curves at a rate of 0.2C, and B1 and B were charging and discharging curves at 1 C. Then Direct Current Resistance (DCR) of 50% SOC (with 50% capacity remaining) was tested, a discharge rate was 2C, and a battery was 3 Ah; A represented a battery made for the first time, and two parallel experiments were done; D represented a battery made for the second time by using the same material, and two parallel experiments were done; and results were shown in FIG. 7.

From FIG. 5, it might be seen that, the cycle performance of the sodium ion battery cathode material of the present disclosure was excellent, and the capacity retention of a 500-week cycle at 1 C was greater than or equal to 95%. From FIG. 6, it might be seen that, the capacity of the sodium ion battery cathode material of the present disclosure was about 118 mAh/g, such that the capacity was relatively high. For the sodium ion battery cathode material of Comparative embodiment 1, the capacity retention of a 500-week cycle at 1 C was only 91%, and 1 C discharge capacity was only 110.5 mAh/g.

Figure 7:
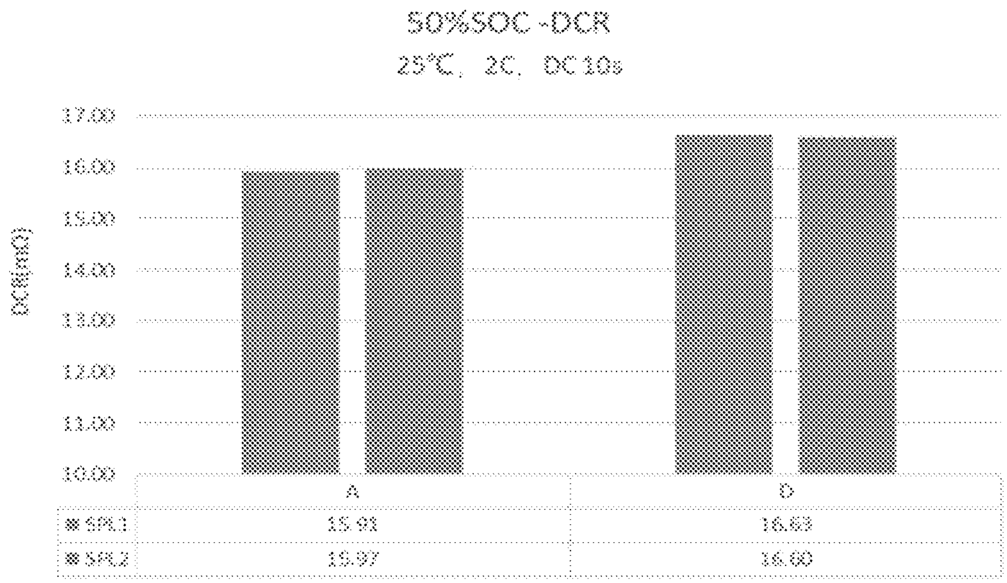
FIG. 7 is a direct current resistance diagram of a sodium ion battery cathode material prepared in Embodiment 1 of the present disclosure at 50% capacity remaining.

From FIG. 7, it might be learned that, DCRs were all 16 mΩ, such that the DCR was relatively low.

From Table 3 and FIGS. 5-7, it might be seen that, the sodium ion battery cathode material of the present disclosure had high compaction density, which was 2.37 g/mL, and expected electrode plate using compaction might reach more than 2.45 g/mL. In addition, the sodium ion battery cathode material of the present disclosure was good in cycle performance, high in capacity, and high in voltage platform. Meanwhile, according to calculation, the cost of the sodium ion battery cathode material of the present disclosure was just under 30% of the cost of lithium iron phosphate, such that cost performance was extremely excellent, and the sodium ion battery cathode material was applicable to the fields such as two-wheeled vehicles, electric buses, and low endurance electric vehicles.

Finally, it should be noted that, the above embodiments are merely for describing and not intended to limit the technical solutions of the present disclosure. Although the present disclosure has been described in detail with reference to the above embodiments, those of ordinary skill in the art should understand that, they can still make modifications to the technical solutions recited in the above embodiments or make equivalent replacements to a part or all of the technical features thereof; and the modifications or replacements do not cause essence of the corresponding technical solutions to depart from the scope of the technical solutions of the embodiments of the present disclosure.

What is claimed is:

1. A method for preparing a sodium ion battery cathode material, comprising the following steps:

(A) grinding a mixture of sodium borohydride and ferric manganese hydroxide to obtain first slurry, and performing spray drying and calcination on the first slurry to obtain a first calcinated material; and (B) grinding a mixture of the first calcinated material, a carbon source, a vanadium source, a sodium source, and water to obtain second slurry, and performing spray drying, calcination, crushing, sieving, and iron removal on the second slurry to obtain a sodium ion battery cathode material.

2. The method for preparing a sodium ion battery cathode material according to claim 1, wherein, in step (A), the calcination comprises: in a nitrogen atmosphere, heating a temperature to 400-500° C., maintaining the temperature for 4-5 h, then heating the temperature to 650-700° C., maintaining the temperature for 3-5 h, and then cooling the temperature to ≤120° C.

3. The method for preparing a sodium ion battery cathode material according to claim 1, wherein, in step (A), a ratio of the sum of the numbers of moles of Fe and Mn in the ferric manganese hydroxide to the number of moles of Na in the sodium borohydride is 0.97-1.02:1.

4. The method for preparing a sodium ion battery cathode material according to claim 1, wherein, in step (A), a method for preparing the ferric manganese hydroxide comprises the following steps:

performing reaction on a manganese salt, a ferrous salt, a complexing agent, sodium hydroxide, hydrazine hydrate, aqueous ammonia, and titanyl sulfate in an aqueous phase, so as to obtain the ferric manganese hydroxide.

5. The method for preparing a sodium ion battery cathode material according to claim 4, wherein a molar ratio of Mn in the manganese salt to Fe in the ferrous salt is 1:1.5-4;

optionally, the manganese salt comprises at least one of manganese sulfate, manganese chloride, and manganese acetate;

optionally, the ferrous salt comprises at least one of ferrous sulfate, ferrous chloride, and ferrous acetate; and optionally, the complexing agent comprises at least one of ethylenediaminetetraacetic acid, ethylenediaminetetraacetic acid disodium salt, sodium hexametaphosphate, and triethanolamine.

6. The method for preparing a sodium ion battery cathode material according to claim 1, wherein, in step (B), the vanadium source comprises ammonium metavanadate;

optionally, the sodium source comprises at least one of sodium bicarbonate, sodium hydroxide, sodium acetate, and sodium nitrate;

optionally, the carbon source comprises nano hydrophilic graphite and/or polyethylene glycol.

7. The method for preparing a sodium ion battery cathode material according to claim 1, wherein, in step (B), a molar ratio of sodium in the first calcinated material, vanadium in the vanadium source, and sodium in the sodium source is 1:0.02-0.03:0.06-0.09.

8. The method for preparing a sodium ion battery cathode material according to claim 1, wherein, in step (B), the calcination comprises: in a nitrogen atmosphere, heating a temperature to 720-750° C., maintaining the temperature for 2-4 h, and then cooling the temperature to ≤80° C.;

optionally, a particle size of the second slurry is 100-200 nm; and optionally, the particle size of the second slurry after spray drying is 5-10 μm.

9. The method for preparing a sodium ion battery cathode material according to claim 2, wherein, a relative humidity of the calcination is 3%-5%.

10. The method for preparing a sodium ion battery cathode material according to claim 2, wherein, the calcination comprises: in the nitrogen atmosphere, heating the temperature to 400-500° C. at a rate of 1-3° C./min, maintaining the temperature for 4-5 h, then heating the temperature to 650-700° C. at the rate of 1-3° C./min, maintaining the temperature for 3-5 h, then cooling the temperature to ≤120° C. at the rate of 1-3° C./min, and performing discharging.

11. The method for preparing a sodium ion battery cathode material according to claim 1, wherein, a particle size of the first slurry is 200-300 nm.

12. The method for preparing a sodium ion battery cathode material according to claim 4, wherein, a reaction temperature is 50-60° C., and reaction time is 15-150 min.

13. The method for preparing a sodium ion battery cathode material according to claim 4, wherein a ratio of the sum of the numbers of moles of the Mn in the manganese salt and the Fe in the ferrous salt to the number of moles of Ti in the titanyl sulfate is 100:0.1-0.2.

14. The method for preparing a sodium ion battery cathode material according to claim 4, wherein a molar ratio of the manganese salt, the complexing agent, the sodium hydroxide, the hydrazine hydrate, and $NH_3 \cdot H_2O$ in the aqueous ammonia is 1:0.01-0.1:5.5-10.5:0.01-0.1:0.05-0.5.

15. The method for preparing a sodium ion battery cathode material according to claim 6, wherein, a mass ratio of the nano hydrophilic graphite to the polyethylene glycol is 1:5-10.

16. The method for preparing a sodium ion battery cathode material according to claim 1, wherein, a mass ratio of the carbon source to the first calcinated material is 3-10:100.

17. The method for preparing a sodium ion battery cathode material according to claim 1, wherein, a ratio of the total mass of the first calcinated material, the carbon source, the vanadium source, and the sodium source to the mass of the water is 1:2-3.

18. The method for preparing a sodium ion battery cathode material according to claim 1, wherein, in step (B), the calcination comprises: in the nitrogen atmosphere, heating the temperature to 720-750° C. at a rate of 1-3° C./min, maintaining the temperature for 2-4 h, and then cooling the temperature to ≤80° C. at the rate of 1-3° C./min.

* * * * *